United States Patent [19]
Green

[11] Patent Number: 5,892,992
[45] Date of Patent: Apr. 6, 1999

[54] PHOTOFLASH UNIT

[75] Inventor: Warren Green, N Chili, N.Y.

[73] Assignee: Eastman Kodak Company, Rochester, N.Y.

[21] Appl. No.: 816,468

[22] Filed: Mar. 13, 1997

[51] Int. Cl.$^6$ .............................. G03B 15/04; F21K 5/08
[52] U.S. Cl. ............................................ 396/191; 431/361
[58] Field of Search ...................................... 396/197, 192, 396/155, 191; 431/361, 364

[56] References Cited

U.S. PATENT DOCUMENTS

| | | | |
|---|---|---|---|
| 3,439,992 | 4/1969 | Shaffer et al. | 431/361 |
| 3,511,586 | 5/1970 | Kopelman et al. | 431/361 |
| 3,540,820 | 11/1970 | Shaffer et al. | 431/361 |
| 3,706,521 | 12/1972 | Kopelman et al. | 431/361 |
| 3,751,656 | 8/1973 | Buckler et al. | 396/191 |

*Primary Examiner*—W. B. Perkey
*Attorney, Agent, or Firm*—Svetlana Z. Short

[57] ABSTRACT

A photoflash unit includes a housing with an internal chamber containing a charge material. The housing's base has an opening. A primer is placed over or proximate to this opening. An anvil is placed over the material and a burn-away sheet is placed over the anvil. The burn-away sheet is sealed to the base and holds the anvil in place. When the anvil is struck percussively through the burn-away sheet, the primer ignites combustible material through the opening in the back wall. The burn-away sheet burns away, allowing the photoflash unit to vent to the rear.

16 Claims, 4 Drawing Sheets

5,892,992

PHOTOFLASH UNIT

FIELD OF THE INVENTION

This invention relates to the manufacture of photoflash units, and more particularly to those of the percussive type.

BACKGROUND OF THE INVENTION

Generally, a percussive type photoflash lamp (see FIG. 1) comprises a hermetically sealed, light-transmitting envelope containing a source of actinic light and having a primer secured thereto. Such photoflash lamps are disclosed in U.S. Pat. No. 3,439,992; U.S. Pat. No. 3, 511,586; U.S. Pat. No. 3,540,820; and U.S. Pat. No. 3,706,521.

More particularly, the percussive type photoflash lamp comprises a length of glass tubing constricted to a tip at one end (domed end) thereof and having a primer cup secured to the other end thereof. The length of glass tubing which defines a lamp envelope contains a combustible material, such as shredded zirconium foil, and a combustion-supporting gas such as oxygen. The primer cup comprises a metal shell within which an anvil and a charge of ignitable material (primer) are disposed.

Operation of a percussive-type photoflash lamp is initiated by a firing pin (also referred to as a striker) which is caused to strike the bottom of the primer cup to promote ignition of the primer disposed therein. Deflagration of the primer ignites the shredded zirconium foil, the combustion of which is the source of the actinic light.

As discussed in U.S. Pat. No. 3,439,992, because of its very rapid burning characteristics, deflagration of the primer causes a very high velocity flow of flame and hot gases up the axis of the flashlamp. This gas flow, in turn, impinges on the shredded zirconium foil, and frequently compresses the shreds into a tightly compacted ball in the domed end of the lamp envelope. Confinement of combustion in the domed end of the lamp envelope imparts a large thermal shock to the lamp envelope. This thermal shock sometimes causes the breakage of the domed end portion of the glass envelope, causing, in turn, the hot gasses to escape outwards at a high velocity and, together with flying glass shreds, to create a potential safety hazard.

SUMMARY OF THE INVENTION

In view of the foregoing, one of the principal objects of this invention is to prevent the hot gasses from escaping into environment.

Another object is to provide a percussive-type flash unit that is inexpensive to manufacture and that has improved safety characteristics.

These and other objects, advantages and features are attained, in accordance with the principles of this invention, by providing a photoflash unit with a primer, an anvil located proximate to the primer, and a burn-away sheet located proximate to the primer and the anvil.

According to a preferred embodiment of the present invention the photoflash unit comprises (i) a sealed, light-transmitting housing with base having an opening therethrough; (ii) a combustible material located within the housing; (iii) a primer secured to the base and proximate to the opening; (iv) an anvil having at least a portion in close proximity to the primer; and (v) a burn-away sheet attached to the housing and covering the primer and the anvil.

BRIEF DESCRIPTION OF THE DRAWINGS

The foregoing and other objects, features and advantages of the invention as well as presently preferred embodiments thereof will become more apparent from a reading of the following description in connection with the accompanying drawings.

DETAILED DESCRIPTION OF THE INVENTION

Figure 1:
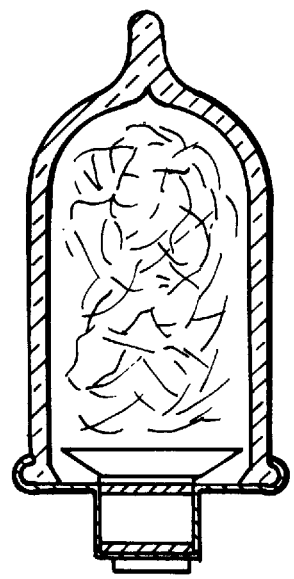
FIG. 1 is a cross-sectional view of a prior art photoflash unit.
Figure 2A:
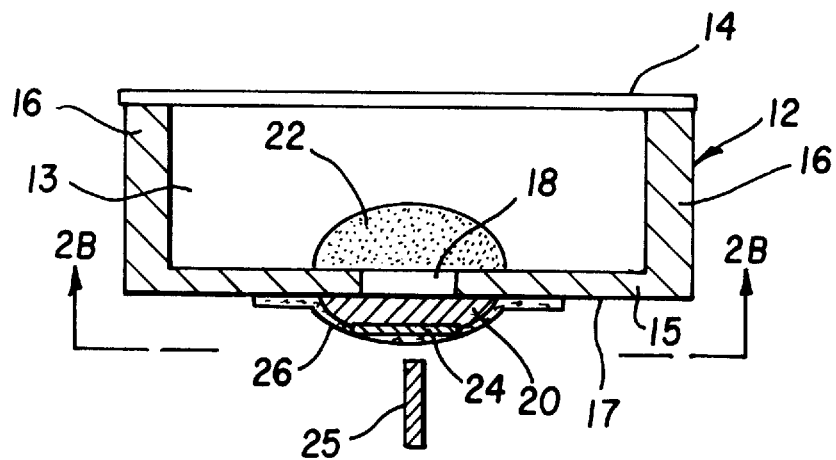
FIG. 2A is a schematic cross-sectional view a first preferred embodiment of the present invention.
Figure 2B:
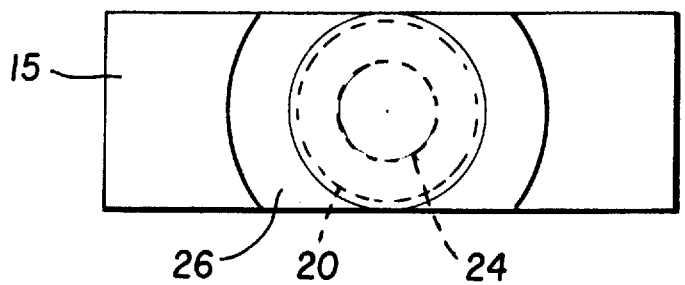
FIG. 2B is a view of a photoflash unit of FIG. 2A taken along line 2b—2b.

Referring now to the drawings, particularly to FIG. 2A thereof, the photoflash unit 10 comprises a housing 12 having a transparent cover 14 defining one end (front end) thereof and having a base with an opening 18 at the other end (back end) thereof. A combustible material 22 containing zirconium is disposed within a housing chamber 13 formed by the housing 12.

More specifically, the photoflash unit 10 of the first embodiment of the present invention includes a rectangular back wall 15 (for a base) and four side walls 16 extending from the back wall 15 towards the transparent cover 14. The transparent cover 14 is sealed to the side walls 16 and can be either glass or other heat-resistant plastic, such as clear polycarbonate. It is preferred that it be a heat-resistant transparent plastic because plastic does not shatter like glass and is therefore a safer material. By "heat resistant" material, I mean, that the material should not burn when it is subjected to short bursts of an intense heat (from about 1000° C. to about 2700° C. for a period of time between 1 and 6 milliseconds). If a non-heat resistant material is used for the cover, the cover will burn and, the resultant carbon buildup will adversely affect the light output of the photoflash unit.

The rest of the housing 12 can be made from ether a transparent or a non-transparent heat-resistant material, such as metal or plastic. A polycarbonate is one example of such heat-resistant plastic material. In order to provide better illumination of an associated object, it is preferred for the inner surfaces of the back wall 15 and the side walls 16 to be reflective. This can be done by aluminizing the inner surfaces with a 100 to 130 micrometer thick layer of aluminum coating. Such a coating will be able to withstand the short bursts of an intense heat. Other reflective coatings, when lined with either glass or clear polycarbonate, will also be able to withstand intense heat, but are more expensive to produce.

A primer 20 is covers the opening 18. This primer 20 is attached to the outer surface 17 of the back wall 15 and extends over the opening 18. An anvil 24 is placed proximate to the primer 20. A burn-away sheet 26 covers the anvil 24. The burn-away sheet 26 is sealed to the wall 15 and holds the anvil 24 in place. It is preferred that the burn-away sheet hermetically seals the primer to keep atmospheric humidity out.

A burn-away sheet 26 is a sheet of material that burns almost instantaneously (within about 1 millisecond) when subjected to temperatures of about 200°–250° C. or higher. Some examples of suitable materials for a burn-away sheet are: very thin (about 25 micrometer thick) aluminum foil, cellophane, or moisture-resistive paper. The anvil 24 is a small mount or plate made of thin aluminum foil or other hard material.

When the anvil 24 is struck by a striker 25, through the burn-away sheet 26, the primer 20 ignites the combustible material 22 through the opening 18. The burn-away sheet 26 burns away, allowing the photoflash unit to vent hot gasses through the opening 18. Thus the opening 18 serves as a vent hole.

Figure 3:
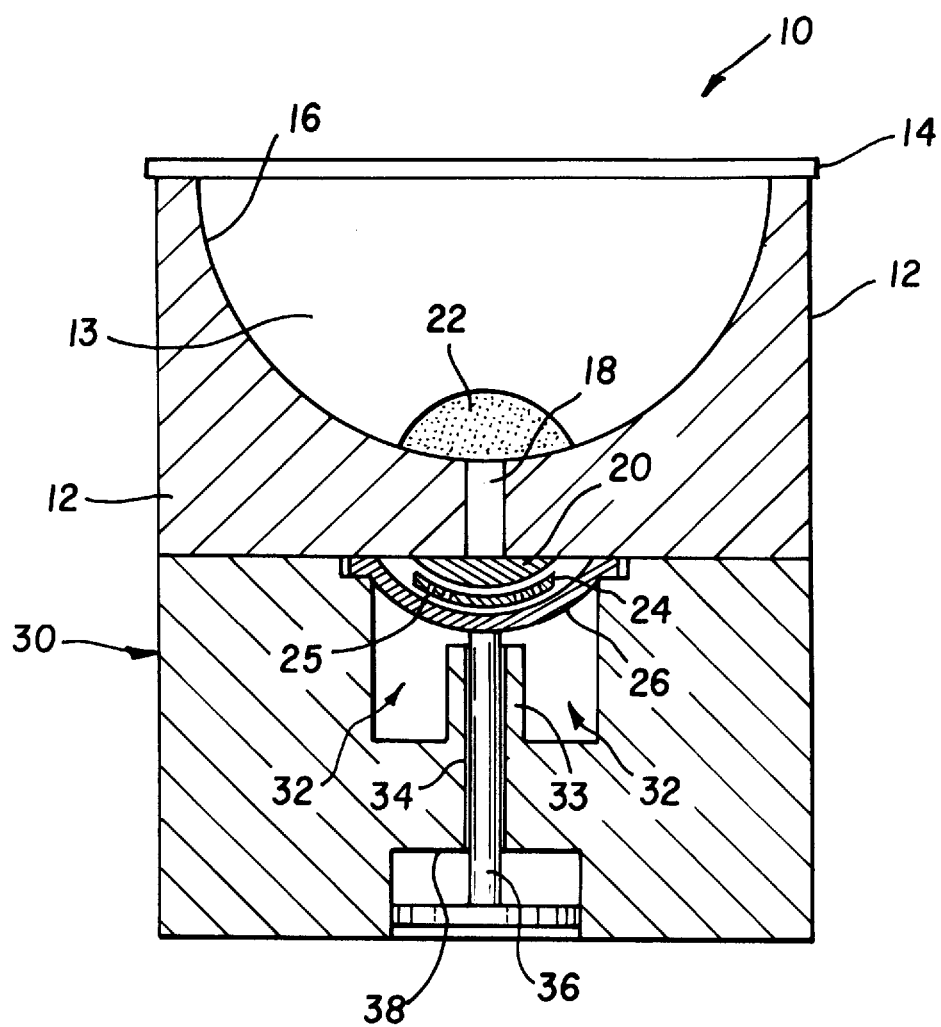
FIG. 3 is a cross-sectional view of a photoflash unit of a second embodiment of the present invention.
Figure 4:
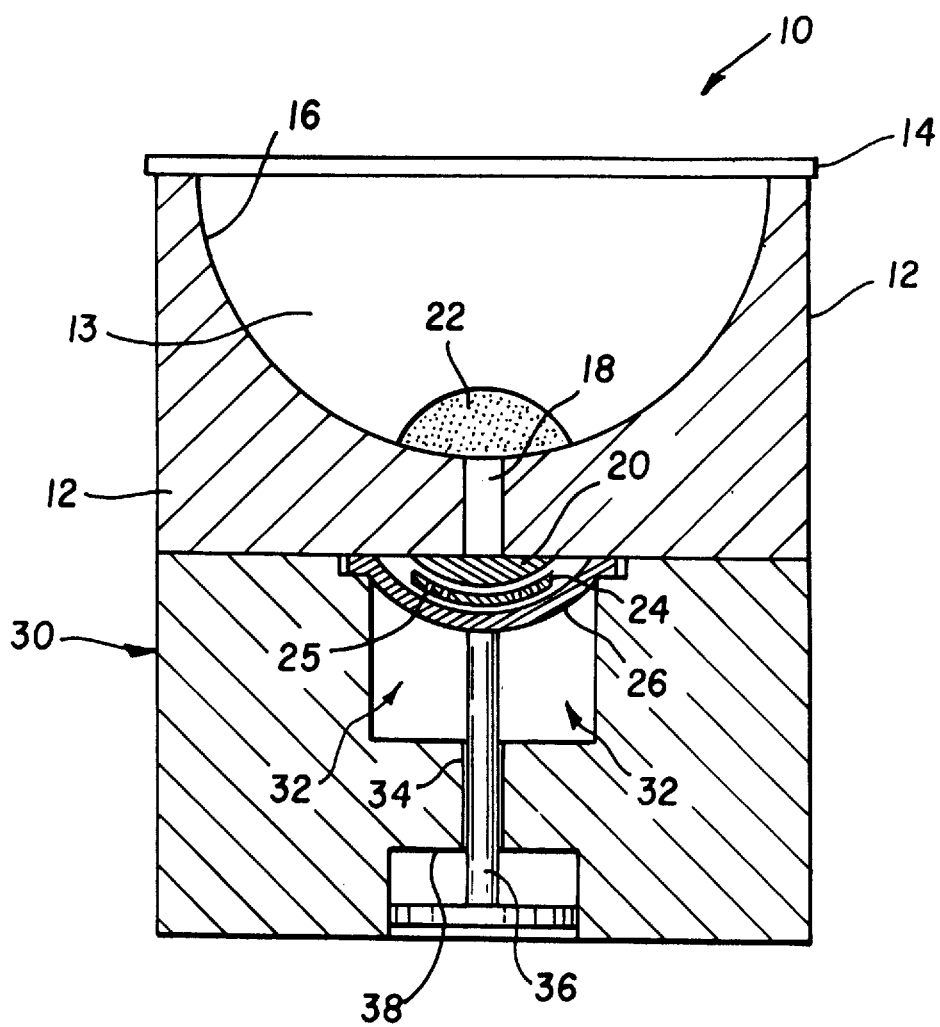
FIG. 4 is a cross-sectional view of a photoflash unit of a third embodiment of the present invention.

FIGS. 3 and 4 illustrate photoflash unit 10 of the second and third preferred embodiments, respectively. As seen in these drawings, the photoflash unit 10 may also comprise a vent unit 30 having one or more vent chambers 32 and/or an opening 34 within which a striker 36 is disposed. The only difference between the second embodiment (FIG. 3) and the third embodiment (FIG. 4) is the presence of an optional lip 33 (surrounding the striker 36) in the second embodiment.

The vent chambers 32 are reservoirs into which the hot gasses are to be vented. It is preferred that the vent chamber(s) has or have about the same volume as the housing chamber 13. It is preferred that the volume $V_v$ of the vent chamber be 70% or more of the volume $V_c$ of the housing chamber 13 (that is, $V_v \geq 0.7 V_c$). It is more preferred that the volume of the vent chamber be more than about 90% and about equal to or smaller than 120% of the volume of the housing chamber 13 (that is, $0.9 V_c \leq V_v \leq 1.2 V_c$). It is even more preferred that this volume $V_v$ be between 100% and 120% of the volume $V_c$ of the housing chamber 13. It was found, trough testing, that as the volume $V_v$ of the vent chamber increases from about 90% to about 120% of the volume of the housing chamber, the flash intensity of the photoflash unit 10 increases roughly proportionally. Thus, the larger the vent chamber, the larger the flash intensity. However, no substantial difference in flash intensity was observed when the vent chamber volume $V_v$ increased beyond 120% of the volume of the housing chamber.

As in the first embodiment, the combustion products of the primer 20 move through the one or more openings 18 in the base of the housing 12 and ignite the combustible material 22 to thereby flash the photoflash unit. The anvil 24 may also have one or more apertures 25 to allow the combustion products of the primer 20 to move towards the combustible material 22 more efficiently. During combustion, the burn-away sheet 26 simply burns away allowing the hot gasses to escape backwards (through the opening 18 of the base) into the vent chamber(s) 32 of the vent unit 30.

It is also noted that the side walls 16 of the photoflash unit 10 of the second and third preferred embodiments are joined together and form a cup-like shape of circular symmetry. The opening 18 is located in base of the housing 12. It is preferred that inside surface of the side walls 16 (forming this base and extending towards the front end of the housing 12) is reflective. The vent unit 30 also has a recess to provide an internal rim 38 on which the striker 36 is seated when the primer is struck.

Figure 5A:
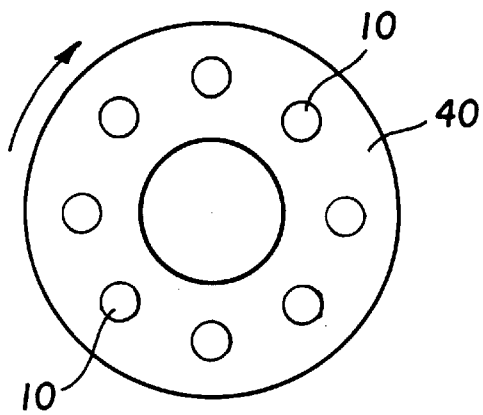
FIG. 5A schematically illustrates several photoflash units of the present invention arranged in a circular fashion on a substrate.
Figure 5B:
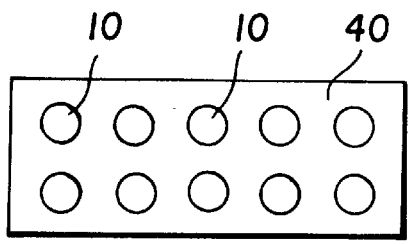
FIG. 5B schematically illustrates several photoflash units of the present invention arranged linearly on another substrate.
Figure 5C:
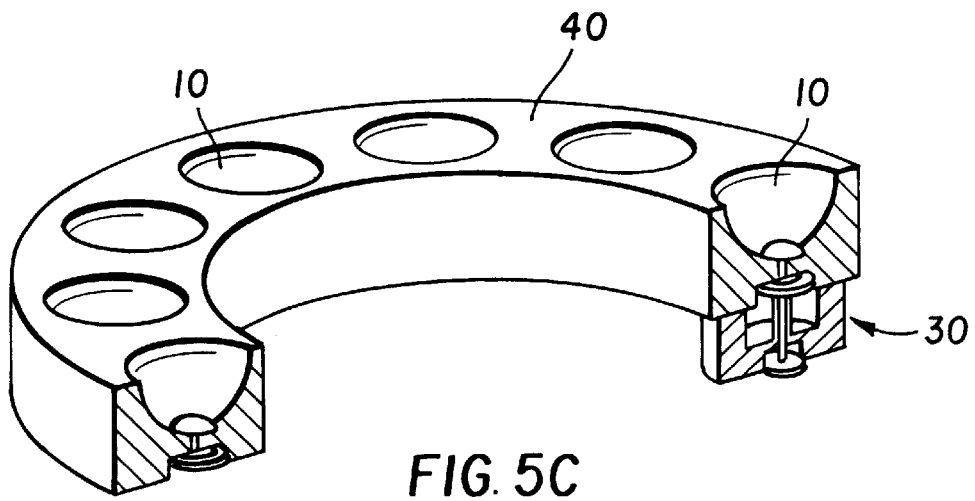
FIG. 5C is a perspective drawing with a crossection, of several photoflash units of FIG. 3 arranged in a circular fashion on an annular substrate and sharing a single vent unit.

FIGS. 5A and 5B show that several flash units 10 may be contained on a substrate 40 (either in a circular fashion or a line), to provide more than one photoflash unit for a camera. Each photoflash unit could contain it's own vent unit 30 having a vent chamber and a striker or, alternatively, the substrate itself may contain a single vent unit 30 with a reusable striker and a reusable vent chamber. This is illustrated in FIG. 5C.

Figure 6:
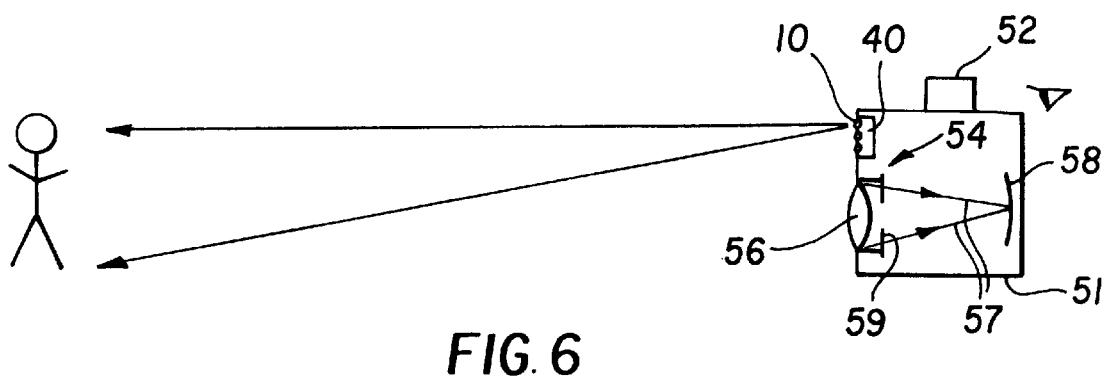
FIG. 6 schematically illustrates a camera containing a photoflash unit of the present invention.

FIG. 6 is a schematic drawing of an exemplary camera 50 utilizing a photoflash unit 10 of the present invention. The camera 50, for taking a picture of an associated object, comprises a body 51 supporting:

(i) a substrate 40 with a plurality of photoflash units 10 capable of illuminating of the associated object;

(ii) a viewfinder 52 for framing the associated object; and (ii) an exposure system 54 comprising a taking lens 56 for channeling light rays 57 containing image data representative of the associated object towards an associated photosensitive medium 58 and, a shutter system 59 with a shutter having an open position and a closed position for controlling access for these light rays 57 to the associated photosensitive medium 58. It is an advantage of the photoflash unit of the present invention that it is safer to operate and provides a better intensity light output than the prior art flash lamps. In addition, the housing, the cover and the vent unit of the photoflash unit of the present invention can be made by molding prosess, making such unit less expensive output than the prior art flash lamps.

The invention has been described in detail with particular reference to the preferred embodiment, but it will be understood that variations and modifications can be effected within the spirit and scope of the invention.

What we claim is:

1. A photoflash unit comprising:
   a housing forming a housing chamber, said housing comprising a base having an opening therethrough;
   a combustible material located within said housing chamber;
   a primer secured to said base and proximate to said opening;
   an anvil having at least a portion in close proximity to said primer; and
   a burn-away sheet attached to said housing and covering said primer and said anvil.

2. The photoflash unit of claim 1 further comprising a striker located proximate to the anvil.

3. The photoflash unit of claim 1 in which the anvil is provided with a plurality of apertures.

4. The photoflash unit of claim 1 wherein said primer covers said opening.

5. The photoflash unit of claim 1 further comprising a vent unit having at least one vent chamber and a striker located proximate to the anvil.

6. The photoflash unit of claim 5, wherein said vent chamber has a volume $V_v$ and wherein $0.7 V_c \leq V_v$, where $V_c$ is the volume of the housing chamber.

7. The photoflash unit of claim 6, wherein $0.9 V_c \leq V_v \leq 1.2 V_c$.

8. The photoflash unit of claim 5 wherein said vent unit has an accurately dimensioned shaft within which the striker is disposed and a recess to provide an internal rim on which the striker is seated.

9. A camera, for imaging a picture of an object on an associated photosensitive medium, comprising: a body supporting (i) a photoflash unit of claim 1 capable of illuminating the associated object;

(ii) an exposure system including a taking lens channeling associated light rays containing image data representative of the associated object towards the associated photosensitive medium, and a shutter system with a shutter having an open position and a closed position, said shutter system controlling access for the light rays to the associated photosensitive medium; and (iii) a viewfinder for framing the associated object.

10. A photoflash unit comprising:

(i) a sealed, light-transmitting housing, said housing comprising a base having an opening therethrough;

(ii) a combustible material located within said housing;

(iii) a primer secured to said base and closing said opening;

(iv) an anvil disposed over said primer, the anvil having at least a portion overlying and in close proximity to said primer; and (v) a burn-away sheet attached to said housing and covering said primer and said anvil.

11. A photoflash unit comprising: a primer, an anvil located proximate to said primer, and a burn-away sheet located proximate to said primer and said anvil.

12. The photoflash unit of claim 11 further containing a housing having a base and a opening therethrough, wherein said burn-away sheet seals said housing.

13. The photoflash unit of claim 11 further containing a housing having a base and a opening therethrough, wherein said burn-away sheet seals said housing and said primer.

14. The photoflash unit of claim 11 further containing a housing having a base and a opening therethrough, wherein said burn-away sheet seals said housing, said primer and said anvil.

15. The photoflash unit of claim 11 further containing a housing having a base and a opening therethrough, wherein said burn-away sheet seals said opening and said primer.

16. The photoflash unit of claim 11 further containing a housing having a base and a opening therethrough, wherein said burn-away sheet seals said opening, said primer and said anvil.

* * * * *